United States Patent
Gross (10) Patent No.: US 10,927,521 B2
(45) Date of Patent: Feb. 23, 2021

(54) EQUALIZER WITH LUBRICATION

(71) Applicant: Joy Global Surface Mining Inc, Milwaukee, WI (US)

(72) Inventor: Matthew L. Gross, West Allis, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 397 days.

(21) Appl. No.: 15/852,347

(22) Filed: Dec. 22, 2017

(65) Prior Publication Data

US 2018/0179725 A1 Jun. 28, 2018

Related U.S. Application Data

(60) Provisional application No. 62/437,952, filed on Dec. 22, 2016.

(51) Int. Cl.
| | |
|---|---|
| *E02F 3/30* | (2006.01) |
| *F16N 9/04* | (2006.01) |
| *E02F 3/58* | (2006.01) |
| *E02F 9/14* | (2006.01) |
| *E02F 3/36* | (2006.01) |
| *E02F 3/407* | (2006.01) |
| *E02F 9/00* | (2006.01) |
| *E02F 3/46* | (2006.01) |

(52) U.S. Cl.
CPC ............... *E02F 3/308* (2013.01); *E02F 3/58* (2013.01); *F16N 9/04* (2013.01); *E02F 3/3677* (2013.01); *E02F 3/4075* (2013.01); *E02F 3/46* (2013.01); *E02F 9/006* (2013.01); *E02F 9/14* (2013.01)

(58) Field of Classification Search
CPC .... F16C 11/045; F16C 2350/26; F16C 33/74; F16C 11/02; E02F 9/006
USPC ........................................................ 184/6.14
See application file for complete search history.

(56) References Cited

U.S. PATENT DOCUMENTS

| | | | | |
|---|---|---|---|---|
| 3,044,838 A | * | 7/1962 | Winer | F16C 23/045 384/213 |
| 3,582,090 A | * | 6/1971 | Lott | F04B 9/117 277/364 |
| 3,762,778 A | * | 10/1973 | Boggs | B62D 55/0887 305/118 |
| 3,923,313 A | * | 12/1975 | Bailey | F16C 11/045 277/367 |

(Continued)

FOREIGN PATENT DOCUMENTS

WO     2015048752     4/2015

OTHER PUBLICATIONS

Chilean Patent Office Action for Application No. 201703315 dated May 27, 2019 (10 pages including statement of relevance).

(Continued)

*Primary Examiner* — Henry Y Liu
(74) *Attorney, Agent, or Firm* — Michael Best & Friedrich LLP (57) ABSTRACT

An equalizer for a mining machine includes an equalizer main body, an internal chamber defined by the main body configured to retain lubrication, and a bushing disposed within the internal chamber. The bushing includes an opening. The equalizer further includes a pin disposed partially in the internal chamber and extending through the opening.

20 Claims, 7 Drawing Sheets

(56) References Cited

U.S. PATENT DOCUMENTS

| | | | | |
|---|---|---|---|---|
| 3,947,077 | A * | 3/1976 | Berg | F16C 11/0614 384/147 |
| 4,022,479 | A * | 5/1977 | Orlowski | F16J 15/4474 277/347 |
| 4,042,065 | A * | 8/1977 | Crum | B62D 55/0887 184/109 |
| 4,150,812 | A * | 4/1979 | Baron | E02F 3/30 254/393 |
| 4,188,146 | A * | 2/1980 | Stecklein | E02F 9/006 172/273 |
| 4,195,852 | A * | 4/1980 | Roley | B62D 55/0887 277/380 |
| 4,251,182 | A * | 2/1981 | Schroeder | B62D 55/0887 384/276 |
| 4,398,862 | A * | 8/1983 | Schroeder | E02F 9/006 384/249 |
| 4,573,728 | A * | 3/1986 | Johnson | B66C 3/005 188/366 |
| 4,706,968 | A * | 11/1987 | Orlowski | F16J 15/4478 277/347 |
| 4,772,150 | A * | 9/1988 | Horton | E02F 9/006 37/468 |
| 4,781,257 | A * | 11/1988 | Gee | B62D 55/08 180/9.5 |
| 4,960,086 | A * | 10/1990 | Rassey | F01L 7/026 123/190.16 |
| 4,961,667 | A * | 10/1990 | Reinsma | E02F 9/006 403/11 |
| 5,074,567 | A * | 12/1991 | Orlowski | F16J 15/4472 277/347 |
| 5,577,858 | A * | 11/1996 | Kasim | E02F 3/58 403/157 |
| 5,799,950 | A * | 9/1998 | Allen | F16C 11/045 277/336 |
| 6,086,257 | A * | 7/2000 | Lee | F16C 33/12 384/279 |
| 6,186,507 | B1 * | 2/2001 | Oldenburg | F16J 15/324 277/353 |
| 6,210,103 | B1 * | 4/2001 | Ramsay | F16C 25/02 415/112 |
| 6,247,702 | B1 * | 6/2001 | Long | F16J 15/447 277/417 |
| 6,250,813 | B1 * | 6/2001 | Thibault | F16C 33/7806 384/495 |
| 6,322,280 | B1 * | 11/2001 | Coyne | E02F 9/006 403/154 |
| 6,390,477 | B1 * | 5/2002 | Drago | F16J 15/164 277/358 |
| 6,648,336 | B1 * | 11/2003 | Kostrzewsky | F16C 17/10 277/549 |
| 6,783,129 | B2 * | 8/2004 | Akita | E02F 9/006 277/349 |
| 7,055,825 | B2 * | 6/2006 | Watanabe | F16J 15/006 277/349 |
| 7,090,403 | B2 * | 8/2006 | Orlowski | F16C 23/045 384/192 |
| 7,367,739 | B2 * | 5/2008 | Brock | F16J 15/3236 403/288 |
| 7,396,017 | B2 * | 7/2008 | Orlowski | F16J 15/187 277/412 |
| 7,438,979 | B2 * | 10/2008 | Takayama | C23C 4/06 384/912 |
| 7,726,661 | B2 * | 6/2010 | Orlowski | F16J 15/54 277/412 |
| 7,748,908 | B2 * | 7/2010 | Aira | E02F 9/006 384/130 |
| 7,878,752 | B2 * | 2/2011 | Schmeling | E02F 9/006 37/468 |
| 8,333,528 | B2 * | 12/2012 | Oertley | F16J 15/344 37/466 |
| 8,596,666 | B1 * | 12/2013 | Hansen | F16C 33/7886 280/515 |
| 8,596,870 | B2 * | 12/2013 | Akita | F16J 15/3276 384/140 |
| 8,679,400 | B2 * | 3/2014 | Takayama | E02F 3/425 419/32 |
| 8,888,621 | B2 * | 11/2014 | Yamane | B65G 45/08 474/91 |
| 8,979,093 | B2 * | 3/2015 | Orlowski | F16J 15/187 277/412 |
| 9,004,491 | B2 * | 4/2015 | Orlowski | F16J 15/002 277/353 |
| 9,556,902 | B2 * | 1/2017 | Blunier | E02F 9/00 |
| 9,783,953 | B2 * | 10/2017 | Gross | E02F 3/47 |
| 10,041,528 | B2 * | 8/2018 | Ginn | F16C 11/04 |
| 10,203,036 | B2 * | 2/2019 | Hoehle | F16J 15/4478 |
| 10,364,895 | B2 * | 7/2019 | Shah | F16J 15/4474 |
| 10,422,105 | B2 * | 9/2019 | Gross | E02F 3/58 |
| 10,550,890 | B2 * | 2/2020 | Fangauf | F16F 9/36 |
| 2003/0102635 | A1 * | 6/2003 | Akita | F16C 33/74 277/549 |
| 2003/0150140 | A1 * | 8/2003 | Takayama | F16C 33/103 37/458 |
| 2003/0235354 | A1 * | 12/2003 | Orlowski | F16C 23/045 384/192 |
| 2004/0207160 | A1 * | 10/2004 | von Geisau | F16J 15/326 277/549 |
| 2005/0051975 | A1 * | 3/2005 | Takayama | C23C 30/00 277/650 |
| 2005/0163408 | A1 * | 7/2005 | Wakabayashi | E02F 9/006 384/279 |
| 2006/0022412 | A1 * | 2/2006 | Brock | F16J 15/3456 277/358 |
| 2006/0093246 | A1 * | 5/2006 | Akita | F16C 33/109 384/279 |
| 2007/0009757 | A1 * | 1/2007 | Takayama | B22F 1/0003 428/644 |
| 2007/0013142 | A1 * | 1/2007 | Chitren | F16J 15/4478 277/411 |
| 2007/0241514 | A1 * | 10/2007 | Orlowski | F16J 15/443 277/549 |
| 2008/0146467 | A1 * | 6/2008 | Takayama | C22C 33/0278 508/105 |
| 2009/0136291 | A1 * | 5/2009 | McClanahan | F16B 19/00 403/156 |
| 2012/0177528 | A1 * | 7/2012 | Takayama | E02F 9/006 419/38 |
| 2013/0136570 | A1 * | 5/2013 | Colwell | E02F 3/60 414/722 |
| 2013/0195593 | A1 * | 8/2013 | Knuth | E02F 3/40 414/697 |
| 2013/0228398 | A1 * | 9/2013 | Voelz | F01M 1/02 184/6 |
| 2013/0277917 | A1 * | 10/2013 | Orlowski | F16J 15/40 277/346 |
| 2014/0007466 | A1 * | 1/2014 | Gross | E02F 3/58 37/399 |
| 2015/0016761 | A1 * | 1/2015 | Akita | F16C 11/045 384/125 |
| 2015/0345106 | A1 * | 12/2015 | Gross | E02F 3/4075 37/396 |

OTHER PUBLICATIONS

"Full-Film Lubrication", Mobil Technical Bulletin, chaper 2, Apr. 3, 1973, pp. 10-19, Mobil Oil Corporation, Product Promotion Division, New York, New York.

"Grooving Specifications", Mobil Technical Bulletin, Chapter 7, Apr. 3, 1973, pp. 50-57, p. 64, Mobil Oil Corporation, Product Promotion Division, New York, New York.

"Bearing Fabrication and Assembly", Mobil Technical Bulletin, Chapter 9, Apr. 3, 1973, p. 65, Mobil Oil Corporation, Product Promotion Division, New York, New York.

(56) References Cited

OTHER PUBLICATIONS

"Grooving of Plain Bearings", Mobil Technical Bulletin, Apr. 3, 1973, pp. 1-16, Mobil Oil Corporation, Product Promotion Division, New York, New York.

* cited by examiner

EQUALIZER WITH LUBRICATION

CROSS-REFERENCE TO RELATED APPLICATIONS

This application claims priority to U.S. Provisional Application No. 62/437,952, filed Dec. 22, 2016, the entire contents of which are incorporated herein by reference.

BACKGROUND OF THE INVENTION

The present invention relates to the field of earthmoving machines. Specifically, the present invention relates to an equalizer for a mining shovel.

A conventional rope mining shovel includes a boom, a handle moveably coupled to the boom, a dipper that is coupled to the handle, an equalizer that is coupled to the dipper, and a hoist rope that is coupled to the equalizer. The hoist rope passes over a boom sheave coupled to an end of the boom, and is reeled in and paid out by a hoist drum. The equalizer aligns the hoist rope to be tangent to the boom sheave, reducing wear on the rope. The equalizer is a plate fabrication, having a plurality of apertures and windows for weld access.

During a hoist phase, the rope is reeled in by the hoist drum, lifting the dipper upward through a bank of material and liberating the material to be dug. To release the material disposed within the dipper, a dipper door is pivotally coupled to the dipper. When not latched to the dipper, the dipper door pivots away from a bottom of the dipper, thereby freeing the material out through a bottom of the dipper.

SUMMARY

In accordance with one construction, an equalizer for a mining machine includes an equalizer main body that is a single cast piece, an internal chamber defined by the main body configured to retain lubrication, and a bushing disposed within the internal chamber. The bushing includes an opening. The equalizer further includes a pin disposed partially in the internal chamber and extending through the opening.

In accordance with another construction, an equalizer for a mining machine includes an equalizer main body, an internal chamber defined by the main body, a bushing disposed within the internal chamber, the bushing including an opening configured to receive a pin, a pin extending through the opening, an end cap coupled to the main body, a sealing structure coupled to the end cap and pressed against the pin, and lubrication sealed within the internal chamber.

Other aspects of the invention will become apparent by consideration of the detailed description and accompanying drawings.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting.

DETAILED DESCRIPTION

Figure 1:
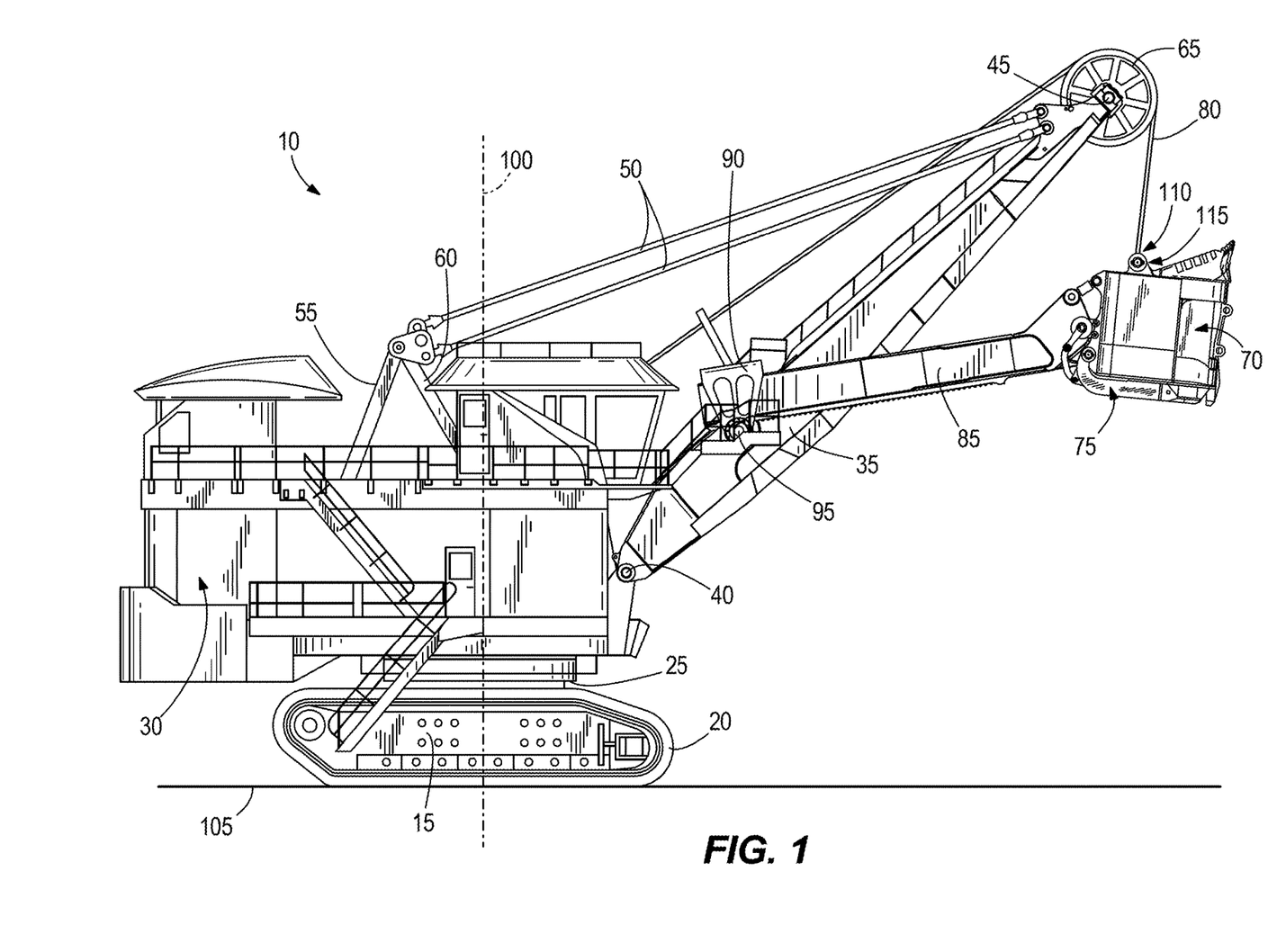
FIG. 1 is a side view of a mining shovel according to one construction.

FIG. 1 illustrates a power shovel 10. The shovel 10 includes a mobile base 15, drive tracks 20, a turntable 25, a revolving frame 30, a boom 35, a lower end 40 of the boom 35 (also called a boom foot), an upper end 45 of the boom 35 (also called a boom point), tension cables 50, a gantry tension member 55, a gantry compression member 60, a sheave 65 rotatably mounted on the upper end 45 of the boom 35, a dipper 70, a dipper door 75 pivotally coupled to the dipper 70, hoist ropes 80 (one shown), a winch drum (not shown), a dipper handle 85, a saddle block 90, a shipper shaft 95, and a transmission unit (also called a crowd drive, not shown). The rotational structure 25 allows rotation of the upper frame 30 relative to the lower base 15. The turntable 25 defines a rotational axis 100 of the shovel 10. The rotational axis 100 is perpendicular to a plane 105 defined by the base 15 and generally corresponds to a grade of the ground or support surface.

The mobile base 15 is supported by the drive tracks 20. The mobile base 15 supports the turntable 25 and the revolving frame 30. The turntable 25 is capable of 360-degrees of rotation relative to the mobile base 15. The boom 35 is pivotally connected at the lower end 40 to the revolving frame 30. The boom 35 is held in an upwardly and outwardly extending relation to the revolving frame 30 by the tension cables 50, which are anchored to the gantry tension member 55 and the gantry compression member 60. The gantry compression member 60 is mounted on the revolving frame 30.

The dipper 70 is suspended from the boom 35 by the hoist ropes 80. The hoist ropes 80 are wrapped over the sheave 65 and are coupled to an equalizer 110, which is coupled to the dipper 70. The hoist ropes 80 are anchored to the winch drum (not shown) of the revolving frame 30. The winch drum is driven by at least one electric motor (not shown) that incorporates a transmission unit (not shown). As the winch drum rotates, the hoist ropes 80 are paid out to lower the dipper 70 or pulled in to raise the dipper 70. The dipper handle 85 is also coupled to the dipper 70. The dipper handle 85 is slidably supported in the saddle block 90, and the saddle block 90 is pivotally mounted to the boom 35 at the shipper shaft 95. The dipper handle 85 includes a rack and tooth formation thereon that engages a drive pinion (not shown) mounted in the saddle block 90. The drive pinion is driven by an electric motor and transmission unit (not shown) to extend or retract the dipper handle 85 relative to the saddle block 90.

An electrical power source (not shown) is mounted to the revolving frame 30 to provide power to a hoist electric motor (not shown) for driving the hoist drum, one or more crowd electric motors (not shown) for driving the crowd transmission unit, and one or more swing electric motors (not shown) for turning the turntable 25. Each of the crowd, hoist, and swing motors is driven by its own motor controller, or is alternatively driven in response to control signals from a controller (not shown).

Figure 2:
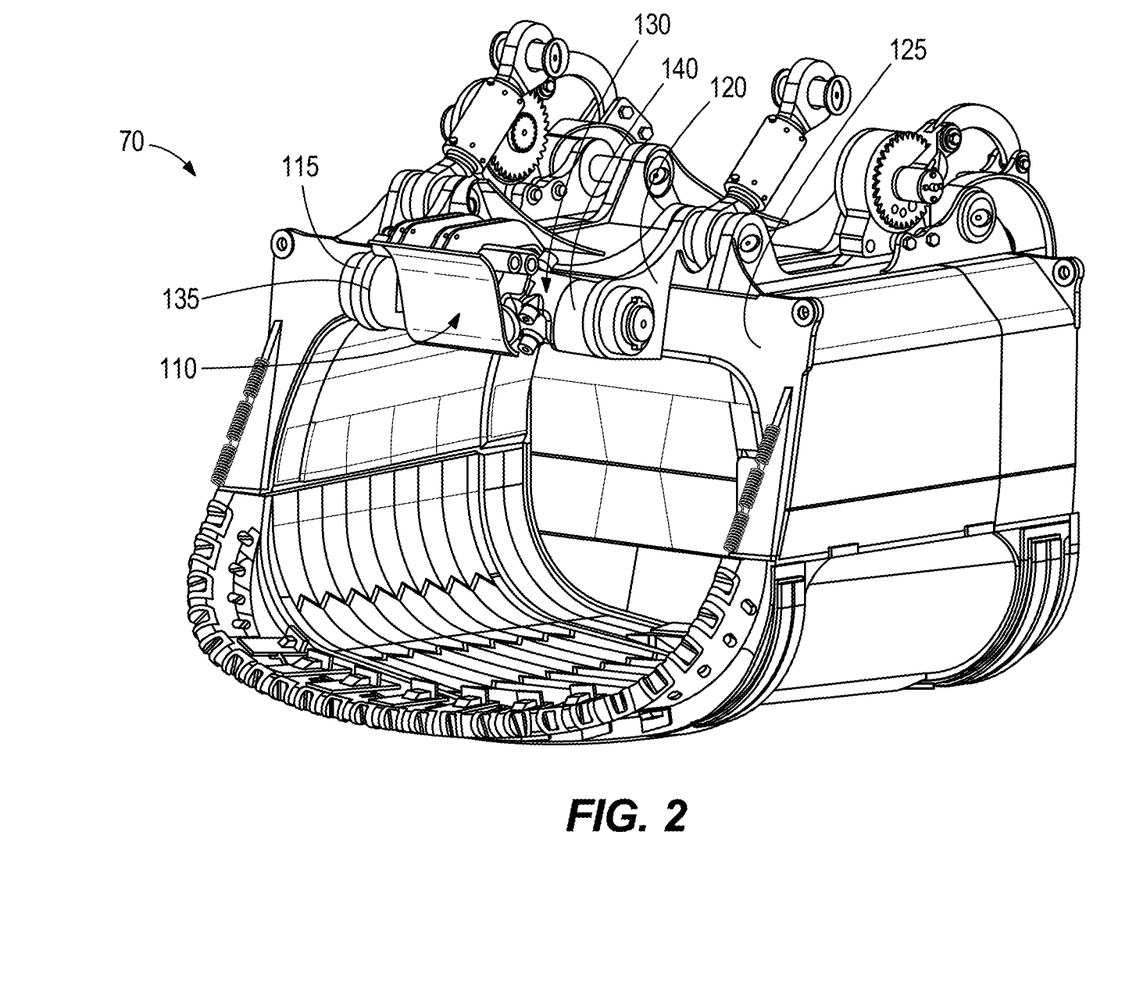
FIG. 2 is a perspective view of a dipper of the mining shovel of FIG. 1, and an equalizer coupled to a dipper.

With reference to FIG. 2, the dipper 70 includes a first mating projection 115 (e.g., a lug) and a second mating projection 120 (e.g., a lug) that each extend from a back wall 125 of the dipper 70. The equalizer 110 is generally disposed between and is coupled to the first and second mating projections 115, 120.

Figure 3:
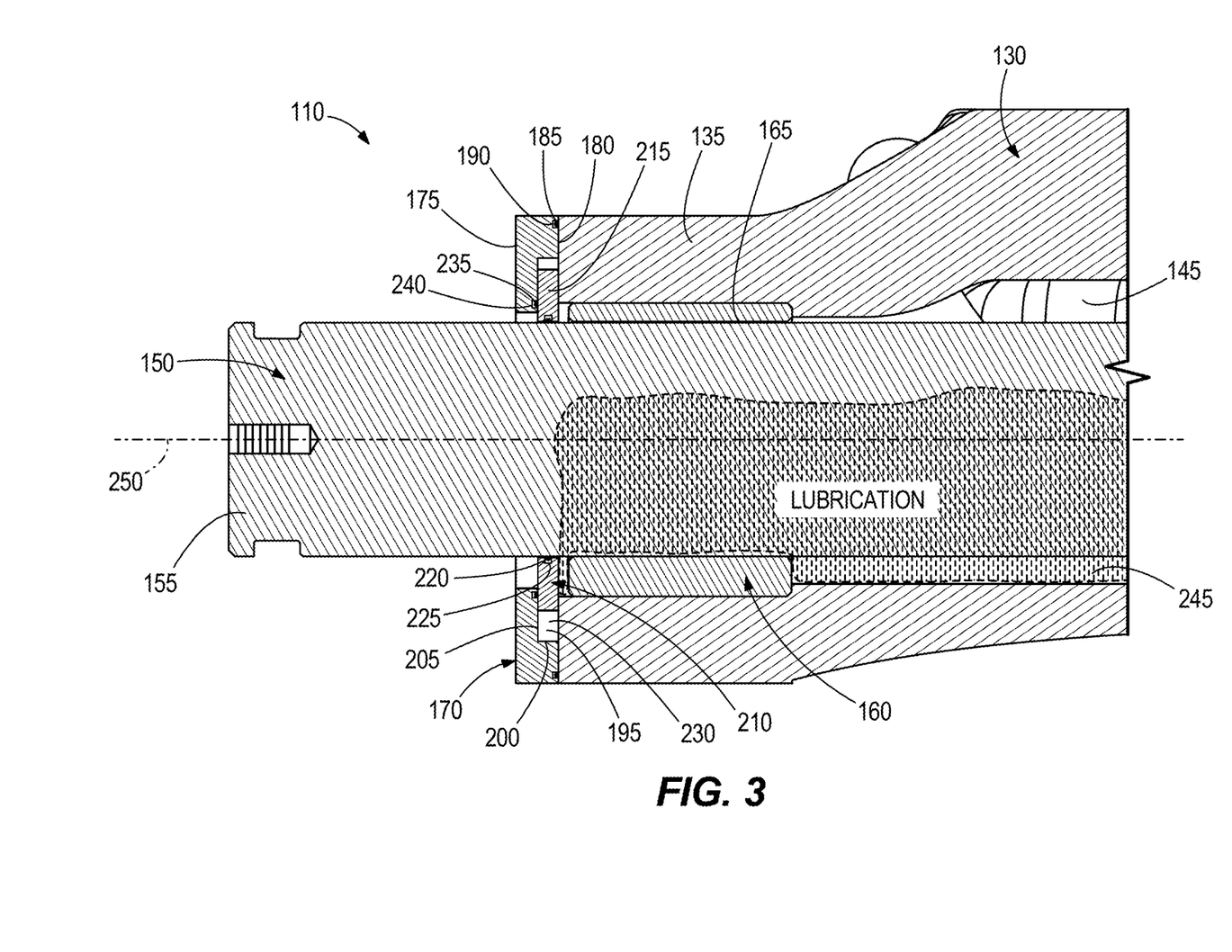
FIGS. 3 and 4 are side and perspective cross-sectional views, respectively, of one end of the equalizer, illustrating sealing structures that hold lubrication within the equalizer.
Figure 4:
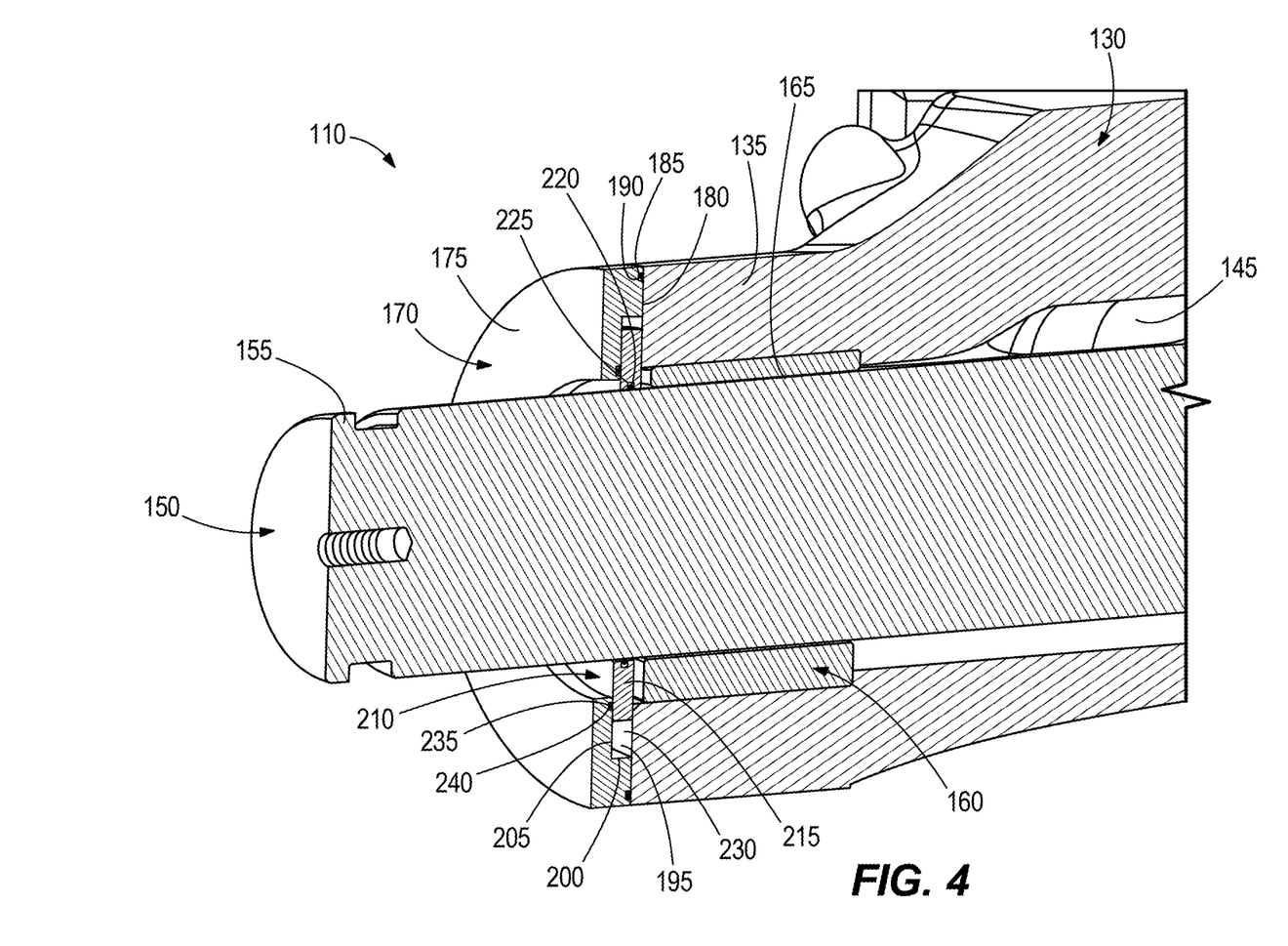

With reference to FIGS. 2-4, the equalizer 110 includes a main body 130 that is a single cast piece having a first end 135 and an opposite, second end 140. The cast piece does not include apertures or holes for weld access. As illustrated in FIGS. 3 and 4, the main body 130 defines an internal chamber 145 that is open at the first end 135. The chamber 145 is formed during the casting process. A pin 150 extends through the first end 135 and into the open chamber 145. In the illustrated construction, the pin 150 is an induction hardened pin having an end 155 that projects out of the main body 130 and fits into one of the first and second mating projections 115, 120. Other constructions include different types, shapes, and sizes of pins 150 than that illustrated.

With continued reference to FIGS. 3 and 4, the equalizer 110 includes a bushing 160 disposed within the chamber 145. The bushing 160 includes an opening 165 to receive the pin 150, and to facilitate rotation of the pin 150 relative to the main body 130. In the illustrated construction the bushing 160 is a standard manganese bushing, although other constructions include different bushings. For example, in some constructions the bushing 160 is a plain spherical bushing.

With continued reference to FIGS. 3 and 4, the equalizer 110 includes an end cap 170 coupled to the first end 135 of the main body 130. In the illustrated construction, the end cap 170 is a generally disc-like structure having an outer diameter that is identical or substantially identical to an outer diameter of the first end 135 of the main body 130. However, other constructions include different shapes and sizes than that illustrated.

As illustrated in FIGS. 3 and 4, the end cap 170 includes an outer circumferential surface 175 that faces away from the first end 135, and a smaller, inner circumferential surface 180 that faces toward the first end 135. In the illustrated construction, a first sealing structure 185 (e.g., polyurethane, etc.) is provided along the inner circumferential surface 180 within a circumferential notch 190 in the end cap 170. When the end cap 170 is coupled to the main body 130 (e.g., with fasteners or other structures), the first sealing structure 185 presses against the first end 135, thereby sealing the end cap 170 to the main body 130.

With continued reference to FIGS. 3 and 4, the end cap 170 further includes a recess 195 defined by a first circumferential surface 200 that extends transverse to both the outer circumferential surface 175 and the inner circumferential surface 180, and a second circumferential surface 205 that extends parallel to both the outer circumferential surface 175 and the inner circumferential surface 180. The recess 195 extends circumferentially about the pin 150.

With continued reference to FIGS. 3 and 4, the equalizer 110 includes a seal carrier 210 disposed at least partially within the recess 195. The seal carrier 210 includes a carrier body 215, and a second sealing structure 220 (e.g., polyurethane, etc.) provided within a circumferential notch 225 in the carrier body 215. The second sealing structure 220 is a piston seal that presses against the pin 150, thereby sealing the seal carrier 210 to the pin 150. As illustrated in FIGS. 3 and 4, the seal carrier 210 is a floating radial seal, in that there remains a radial gap 230 in the recess 195 between the carrier body 215 and the first circumferential surface 200. The seal carrier 210 therefore "floats" within the recess 195, and remains sealed against the pin 150 even if the bushing 160, for example, experiences radial wear (e.g., in some instances up to an inch) and the pin 150 deflects radially in one direction.

With continued reference to FIGS. 3 and 4, the end cap 170 further includes a third sealing structure 235 (e.g., polyurethane, etc.) that is provided within a circumferential notch 240 along the second circumferential surface 205. The third sealing structure 235 is a face seal that presses against the carrier body 215 of the seal carrier 210, thereby sealing the end cap 170 to the seal carrier 210.

With continued reference to FIGS. 3 and 4, the equalizer 110 includes lubrication 245 (illustrated schematically in FIG. 3 generally as a pool or collection of lubrication within at least a portion of the internal chamber 145). In some constructions, the lubrication 245 is oil, although other constructions include different types of lubrication (e.g., grease, etc.). The lubrication 245 is free to flow, for example, around and alongside the pin 150, and into spaces between the pin 150 and the bushing 160 and generally throughout the internal chamber 145.

While only one end of the equalizer 110 is illustrated in FIGS. 3 and 4, the equalizer 110 of the illustrated construction is symmetrical about a plane extending transverse to an axis 250 (FIG. 3) that passes through both the first and second ends 135, 140 and through the pin 150. Thus, all of the features illustrated in FIGS. 3 and 4 are also present at an opposite end of the equalizer 110, such that the internal chamber 145 is an internal, central space within the equalizer 110 that is large enough to contain lubrication 245 for lubricating bushings 160 at both ends of the equalizer 110.

With continued reference to FIGS. 3 and 4, the first sealing structure 185, the second sealing structure 220, and the third sealing structure 235 work in conjunction to seal the lubrication 245 within the equalizer 110 and within the internal chamber 145. Thus, even if the lubrication 245 flows axially past the bushing 160, the lubrication 245 will be inhibited or prevented from escaping past the end cap 170.

In some constructions, the lubrication 245 moves from one end of the equalizer 110 to the other, or from one location in the equalizer 110 to another, based purely on movement of the shovel 10 itself, or upon movement of the pin 150 and the main body 130. Thus, at least in some constructions, the equalizer 110 does not include a mechanism to generate movement of the lubrication 245. Additionally, the lubrication 245 slows the wear of the bushing 160, the pin 150, and/or of other components and surfaces within the equalizer 110. Thus, the equalizer 110 requires less maintenance and down-time as compared with an equalizer 110 without the added lubrication 245.

Figures 5, 6:
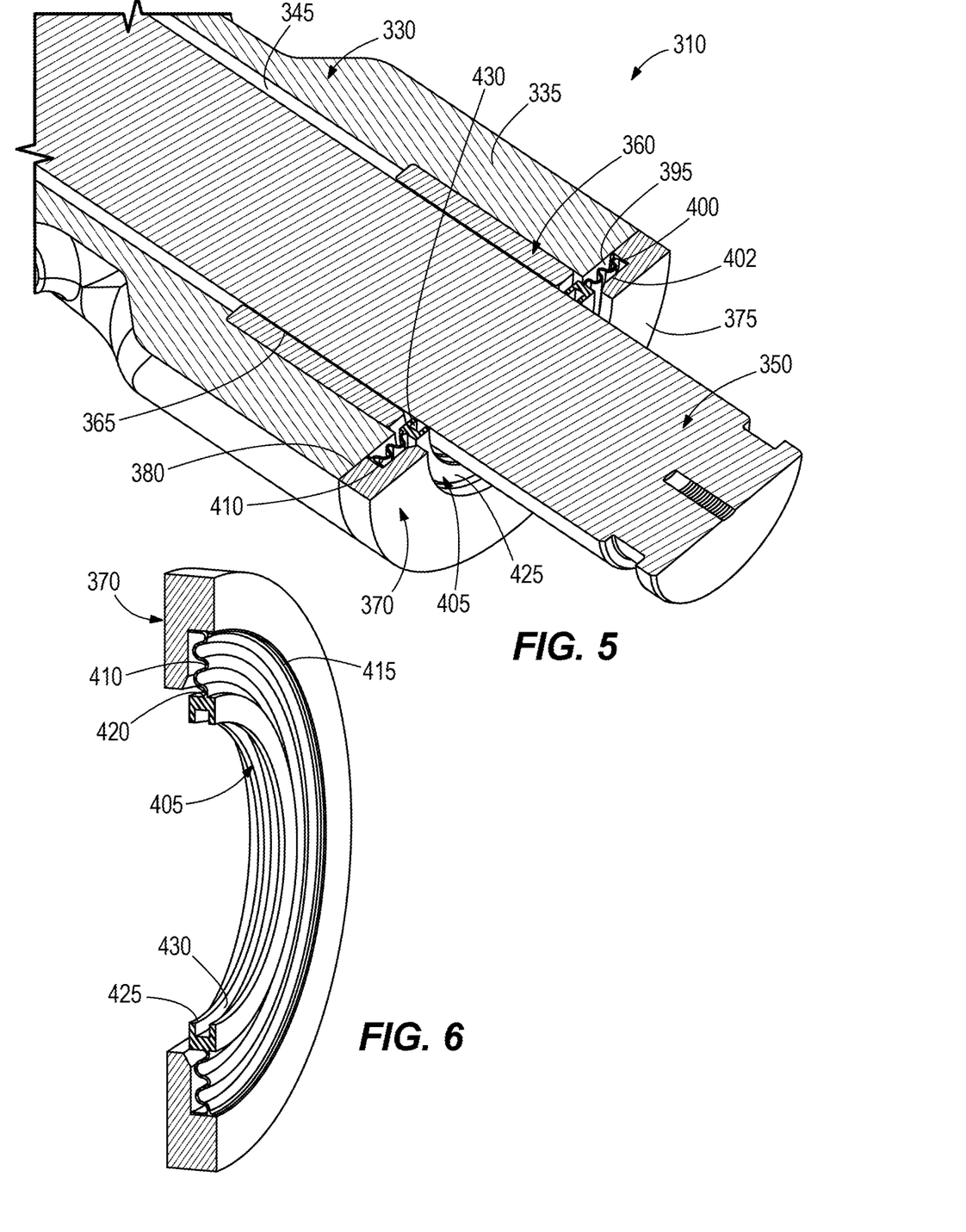
FIGS. 5 and 6 are side and perspective cross-sectional views of an equalizer according to another construction.

FIGS. 5 and 6 illustrate an equalizer 310 according to another construction. Similar to the equalizer 110, the equalizer 310 includes a main body 330 that is a single cast piece having a first end 335 and an opposite end (not shown). The main body 330 defines an internal chamber 345 that is open at the first end 335. The internal chamber 345 is formed during the casting process. A pin 350 extends through the first end 335 and into the open chamber 345. The equalizer 310 also includes a bushing 360 disposed within the chamber 345. The bushing 360 includes an opening 365 to receive the pin 350, and to facilitate rotation of the pin 350 relative to the main body 330. The equalizer 310 also includes an end cap 370 coupled to the first end 335 of the main body 330. The end cap 370 includes an outer circumferential surface 375 that faces away from the first end 335, and a smaller, inner circumferential surface 380 that faces toward the first end 335. The end cap 370 further includes a recess 395 defined by a first circumferential surface 400 that extends transverse to both the outer circumferential surface 375 and the inner circumferential surface 380, and a second circumferential surface 402 that extends parallel to both the outer circumferential surface 375 and the inner circumferential surface 380. The recess 395 extends circumferentially about the pin 350.

With continued reference to FIGS. 5 and 6, the equalizer 310 includes a sealing structure 405 disposed at least partially within the recess 395. In the illustrated construction, the sealing structure 405 includes a corrugated, polyurethane body 410 that is coupled (e.g., vulcanized) at a first, radial outer end 415 (FIG. 6) to the first circumferential surface 400, and is coupled (e.g., vulcanized) at a second, radial inner end 420 (FIG. 6) to a metal rail 425. In the illustrated construction the metal rail 425 has a U-shaped cross-section defining a notch 430. The notch is sized and shaped to receive a further sealing structure (e.g., polyurethane, etc. not shown), which extends out of the notch 430 and presses against the pin 350.

With continued reference to FIGS. 5 and 6, the equalizer 310 also includes lubrication (not shown) disposed within the internal chamber 345 of the main body 330. In some constructions, the lubrication is oil, although other constructions include different types of lubrication (e.g., grease, etc.). The lubrication is free to flow alongside the pin 350, and into spaces between the pin 350 and the bushing 360.

With continued reference to FIGS. 5 and 6, the sealing structure 405 (and further sealing structure) seals the lubrication within the equalizer 310 and within the internal chamber 345. Thus, even if the lubrication 445 flows axially past the bushing 360, the lubrication 445 will be inhibited or prevented from escaping past the end cap 370.

Similar to the equalizer 110, in the equalizer 310 all of the features illustrated in FIGS. 5 and 6 are also present at an opposite end of the equalizer 310, such that the internal chamber 345 is an internal, central space within the equalizer 310 that is large enough to contain lubrication for lubricating bushings 360 at both ends of the equalizer 310.

Figure 7:
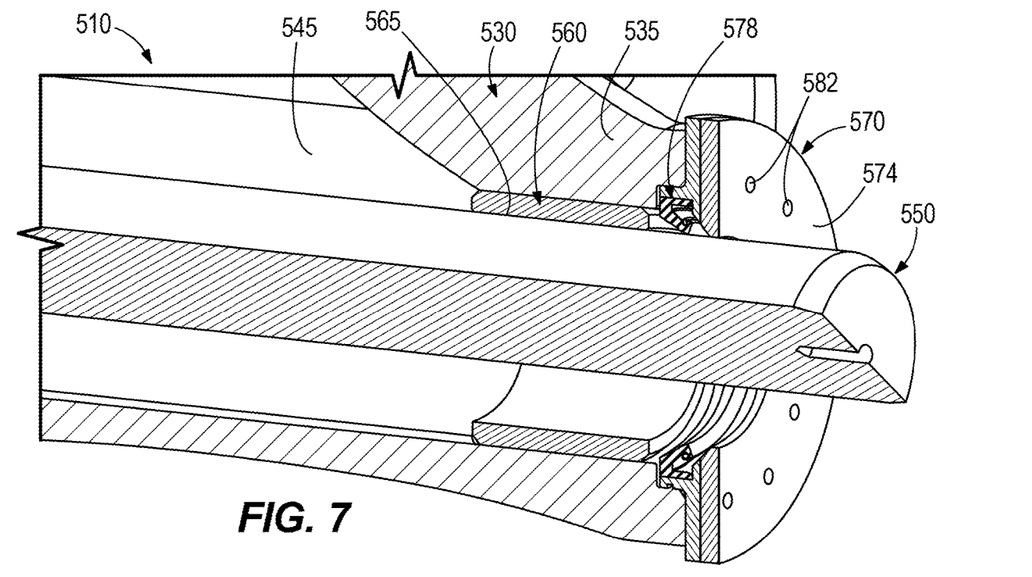
FIGS. 7-9 are perspective, cross-sectional views of an equalizer according to another construction.
Figure 8:
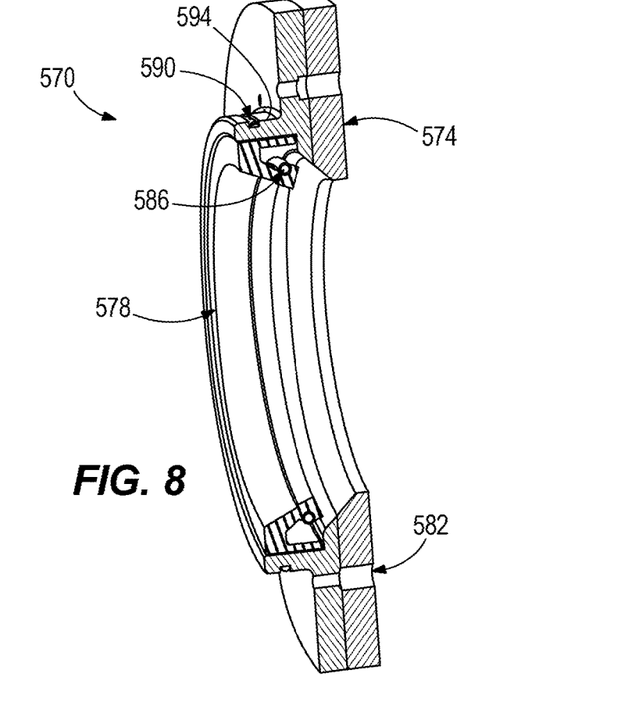
Figure 9:
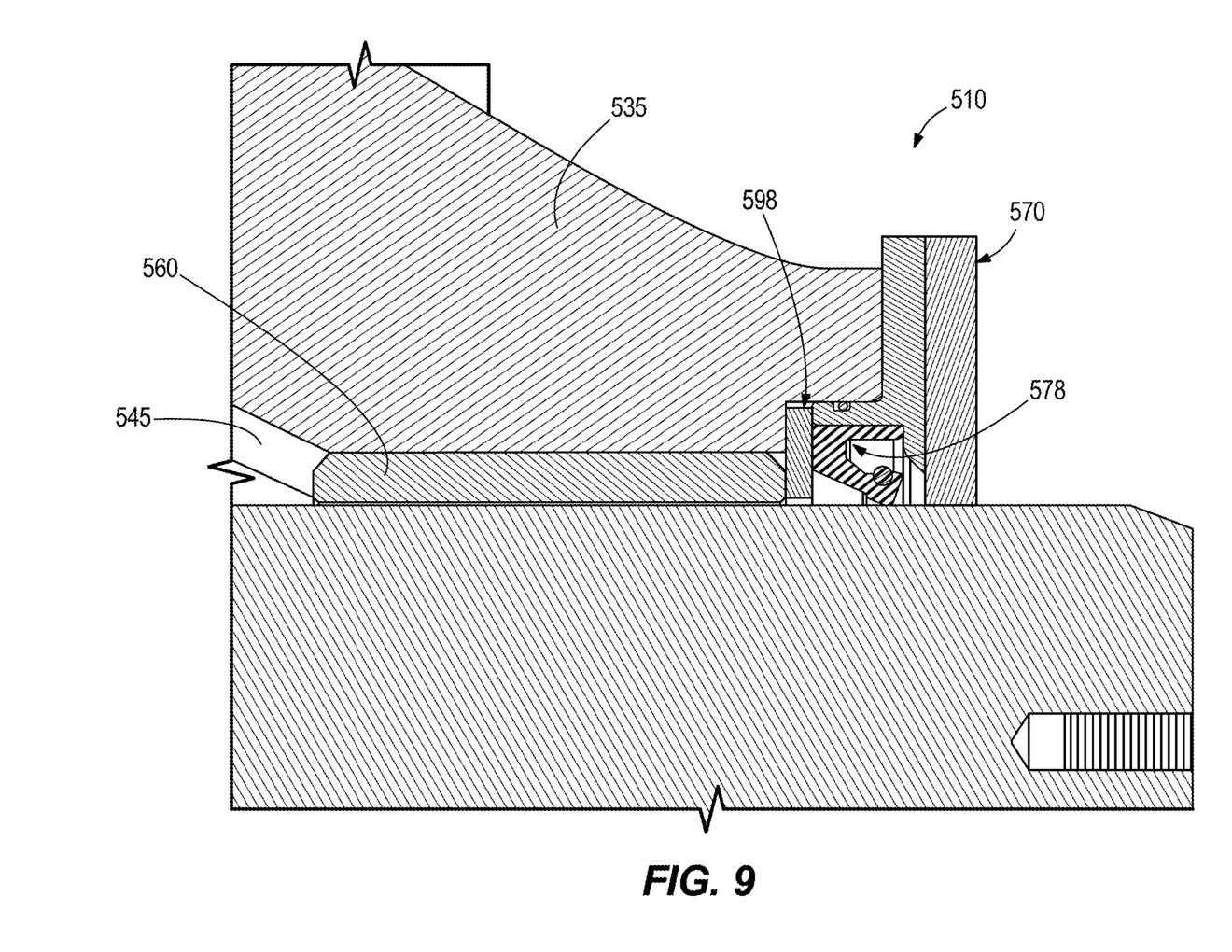

FIGS. 7-9 illustrate an equalizer 510 according to another construction. Similar to the equalizers 110 and 310, the equalizer 510 includes a main body 530 that is a single cast piece having a first end 535 and an opposite end (not shown). The main body 530 defines an internal chamber 545 that is open at the first end 535. The internal chamber 545 is formed during the casting process. A pin 550 extends through the first end 535 and into the open chamber 545. The equalizer 510 also includes a bushing 560 disposed within the chamber 545. The bushing 560 includes an opening 565 to receive the pin 550, and to facilitate rotation of the pin 550 relative to the main body 530. The equalizer 510 also includes an end cap 570 coupled to the first end 535 of the main body 530. The end cap 570 includes a thrust plate 574 and a radial seal (e.g., elastomeric) 578 coupled to the thrust plate 574. In the illustrated construction, the thrust plate 574 is formed at least partially from $MoS_2$, and includes mounting apertures 582 for insertion of screws or other fasteners to affix the thrust plate 574 to the main body 530. Other constructions include different materials, as well as different locations for mounting apertures 582 than that illustrated. As illustrated in FIG. 8, the equalizer 510 also includes a garter spring 586 that assists in pressing the radial seal 578 against the pin 550, and an O-ring 590 that is coupled to a radially exterior surface 594 of the thrust plate 574.

With reference to FIG. 9, in the illustrated construction, the equalizer 510 further includes a spacer element 598 (illustrated schematically) disposed within the internal chamber 545 at the first end 535. The spacer element 598 is disposed between the end cap 570 and the bushing 560. The spacer element 598 may be welded in place or otherwise inserted and/or affixed in place, such that the spacer element 598 inhibits or prevents the bushing 560 from moving and sliding toward the radial seal 578. In the illustrated construction, the spacer element 598 is a spacer plate. In other constructions, the spacer element 598 is a snap ring, rope bead (e.g., welded to an inside of the equalizer main body 530), or other element that inhibits or prevents the bushing 560 from moving and sliding toward the radial seal 578.

While various constructions of sealing structures have been described above for the equalizers 110, 310, 510, in other constructions the equalizers 110, 310, 510 include other sealing structures or combinations of sealing structures (e.g., O-rings, gaskets, etc.) to seal lubrication within the equalizer 110, 310, 510.

Although the invention has been described in detail with reference to certain preferred constructions, variations and modifications exist within the scope and spirit of one or more independent aspects of the invention as described.

What is claimed is:

1. An equalizer for a mining machine, the equalizer comprising:
   an equalizer main body;
   an internal chamber defined by the main body;
   a bushing disposed within the internal chamber, the bushing including an opening;
   a pin disposed partially in the internal chamber and extending through the opening; and
   an end cap coupled to the main body, wherein the end cap includes a thrust plate and a radial seal, wherein the thrust plate includes apertures configured to receive fasteners.

2. The equalizer of claim 1, wherein the opening is a first opening, wherein the end cap includes a second opening, and wherein the pin extends through the second opening.

3. The equalizer of claim 1, further comprising a garter spring coupled to the radial seal and configured to press the radial seal against the pin.

4. The equalizer of claim 1, further comprising an O-ring coupled to a radially exterior surface of the end cap.

5. The equalizer of claim 1, further comprising a spacer element disposed between the bushing and the end cap.

6. The equalizer of claim 5, wherein the spacer element is selected from a group consisting of a spacer plate, a snap ring, and a rope bead.

7. The equalizer of claim 1, wherein the end cap has a disc-like structure having an outer diameter that is identical to an outer diameter of the main body.

8. The equalizer of claim 1, wherein the end cap includes an outer circumferential surface that faces away from the internal chamber and a smaller, inner circumferential surface that faces toward the internal chamber.

9. The equalizer of claim 8, wherein the end cap includes a recess defined by a first circumferential surface that extends transverse to both the outer circumferential surface and the inner circumferential surface, and a second circumferential surface that extends parallel to both the outer circumferential surface and the inner circumferential surface.

10. The equalizer of claim 9, wherein the recess extends circumferentially about the pin.

11. The equalizer of claim 1, further comprising lubrication disposed within the internal chamber, wherein the lubrication is at least one of oil or grease, and wherein the lubrication is free to flow around and alongside the pin, and into spaces between the pin and the bushing and throughout the internal chamber.

12. The equalizer of claim 1, wherein the main body is a single cast piece.

13. The equalizer of claim 1, wherein the end cap is coupled directly to the main body.

14. The equalizer of claim 1, wherein the end cap includes a circumferential surface facing the internal chamber and in abutment with an external surface of the main body.

15. An equalizer for a mining machine, the equalizer comprising:
   an equalizer main body;
   an internal chamber defined by the main body;
   a bushing disposed within the internal chamber, the bushing including an opening;
   a pin disposed partially in the internal chamber and extending through the opening;
   an end cap coupled to the main body; and
   a spacer element disposed between the bushing and the end cap.

16. The equalizer of claim 15, wherein the opening is a first opening, wherein the end cap includes a second opening, and wherein the pin extends through the second opening.

17. The equalizer of claim 15, further comprising an O-ring coupled to a radially exterior surface of the end cap.

18. The equalizer of claim 15, wherein the main body is a single cast piece.

19. The equalizer of claim 15, further comprising lubrication disposed within the internal chamber, wherein the lubrication is at least one of oil or grease, and wherein the lubrication is free to flow around and alongside the pin, and into spaces between the pin and the bushing and throughout the internal chamber.

20. The equalizer of claim 15, wherein the end cap is coupled directly to the main body.

\* \* \* \* \*